(12) United States Patent
Zaytsev et al.

(10) Patent No.: US 12,255,905 B2
(45) Date of Patent: Mar. 18, 2025

(54) MACHINE LEARNING MALWARE CLASSIFICATIONS USING BEHAVIORAL ARTIFACTS

(71) Applicant: CrowdStrike, Inc., Sunnyvale, CA (US)

(72) Inventors: Vitaly Zaytsev, Beaverton, OR (US); Brett Meyer, Alpharetta, GA (US); Joel Robert Spurlock, Portland, OR (US)

(73) Assignee: CrowdStrike, Inc., Sunnyvale, CA (US)

( * ) Notice: Subject to any disclaimer, the term of this patent is extended or adjusted under 35 U.S.C. 154(b) by 295 days.

(21) Appl. No.: 17/725,352

(22) Filed: Apr. 20, 2022

(65) Prior Publication Data
US 2023/0344843 A1 Oct. 26, 2023

(51) Int. Cl.
*H04L 9/40* (2022.01)

(52) U.S. Cl.
CPC ........ *H04L 63/1425* (2013.01); *H04L 63/145* (2013.01)

(58) Field of Classification Search
CPC .......................... H04L 63/1425; H04L 63/145
See application file for complete search history.

(56) References Cited

U.S. PATENT DOCUMENTS

| | | | | |
|---|---|---|---|---|
| 8,401,982 | B1 * | 3/2013 | Satish | G06N 20/00 706/20 |
| 2006/0149821 | A1 * | 7/2006 | Rajan | G06Q 10/107 709/206 |
| 2015/0026293 | A1 * | 1/2015 | Tan | H04L 67/1095 709/217 |
| 2015/0220735 | A1 * | 8/2015 | Paithane | G06F 9/45558 726/23 |
| 2017/0024660 | A1 * | 1/2017 | Chen | G06N 5/045 |
| 2017/0063893 | A1 * | 3/2017 | Franc | G06F 21/53 |
| 2018/0004948 | A1 * | 1/2018 | Martin | H04L 63/1425 |
| 2021/0067531 | A1 * | 3/2021 | Meir | G06F 21/554 |
| 2021/0286874 | A1 * | 9/2021 | Jin | G06F 21/577 |
| 2022/0019674 | A1 * | 1/2022 | Frey | H04L 63/1458 |
| 2022/0156372 | A1 * | 5/2022 | Harang | G06F 21/56 |
| 2023/0247048 | A1 * | 8/2023 | Samosseiko | H04L 63/1425 726/23 |

* cited by examiner

*Primary Examiner* — Techane Gergiso
(74) *Attorney, Agent, or Firm* — Lee & Hayes, P.C.

(57) ABSTRACT

Techniques and systems for a security service system configured with a sensor component including a machine learning (ML) malware classifier to perform behavioral detection on host devices. The security service system may deploy a sensor component to monitor behavioral events on a host device. The sensor component may generate events data corresponding to monitored operations targeted by malware. The system may map individual events from events data onto a behavioral activity pattern and generate process trees. The system may extract behavioral artifacts to build a feature vector used for malware classification and generate a machine learning (ML) malware classifier. The sensor component may use the ML malware classifier to perform asynchronous behavioral detection on a host device and process system events for malware detection.

19 Claims, 6 Drawing Sheets

MACHINE LEARNING MALWARE CLASSIFICATIONS USING BEHAVIORAL ARTIFACTS

With computer and Internet use forming an ever greater part of day to day life, security exploits and cyberattacks directed to stealing and destroying computer resources, data, and private information are becoming an increasing problem. Some attacks are carried out using "malware", or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware is increasingly obfuscated or otherwise disguised in an effort to avoid detection by security software. Determining whether a program is malware or is exhibiting malicious behavior can thus be very time-consuming and resource-intensive.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques and systems for a security service system to generate and use a malware classifier that performs asynchronous behavioral detection based on composed behavioral artifacts. The security service system (also being referred to herein as a "security system" or a "system") may configure a sensor component to use a machine learning (MHL) malware classifier to perform the asynchronous behavioral detection on a host device at a local level. In some examples, the security system may deploy the sensor component to monitor behavioral events on the host device. The sensor component may generate events data corresponding to monitored operations targeted by a malicious attack and/or malware. To generate the events data, the system may profile target malicious processes and may register and/or capture changes. This profiling may include, but is not limited to, network traces, registry modifications, file system changes, memory access, and the like.

The security service system may map individual events onto a behavioral activity pattern. In some examples, the system may determine individual events from a portion of the events data is associated with malicious behavior. The system may map the individual events onto a behavioral activity pattern and aggregate the "individual events" to compose a single artifact. By aggregating multiple "individual events" associated with the malicious behavior, the system may generate multiple artifacts associated with the malicious behavior. The system may focus on a specific class of artifacts (e.g., "behavioral artifacts," also referred to herein as "behaviors") from the multiple artifacts. The behaviors may include filtered or unfiltered information captured by the behavioral activity pattern. The system may use the behavioral artifacts to identify behaviors and/or capture information for the malicious process rather than isolated single events. As will be described herein, the system may use the behavioral artifacts to perform asynchronous behavioral detection.

In some examples, the system may use the portion of the events data to track processes and determine relationship information associated with any portion of a process tree (e.g., information associated with an immediate parent and/or grandparent of a process). The system may aggregate data for any portion of the process tree and may generate an associated feature vector, including behaviors from all or a subset of processes that participated in the malicious activity and/or malware replication. In various examples, the subset of processes may be defined by a "sliding process window" (e.g., 5 seconds, 10 seconds, 60 seconds, 5 minutes, etc.).

In some examples, initially, the security service system may monitor host devices over a predetermined period of time to extract behavioral artifacts and build feature vectors used for malware classification. The security service system may observe and track interactions between processes and between system binaries (e.g., program files) and underlying system components (e.g., file system, registry, network, memory, etc.) for the predetermined period of time. The predetermined period of time may be any amount of time (e.g., one week, two weeks, one month, etc.) adequate for the system to collect sufficient events data for training data. In alternative and/or additional examples, the security system may use any portion of data, from a database of stored historical events data, as training data. The training data is used to train a machine learning model ("ML malware classifier") to extract behavioral artifacts and build a feature vector used for malware classification. The feature vector may include explicit features derived from a file system, network, registry, and processes interaction. The system may determine features engineered from behavioral artifacts generated by the all or the subset of processes ("any portion of the process tree") which participated in behavioral monitoring to increase the accuracy of the classification and to increase effectiveness against arbitrary evasions by an adversary (i.e., spreading the malicious behaviors across multiple processes and multiple stages of attack). In some examples, the system may generate the feature vector for a subset of processes defined by a sliding process window.

In additional examples, the security service system may implement a malware classifier using predictive modeling techniques. As described herein, the system may generate the feature vector used for malware classification. The system may use a corpus of malware, which may be labeled by an analyst with labels including "features" based on observed behaviors related to processes and/or "maliciousness" of a file, as training data. Using a portion of the training data, the system may apply ML classification techniques to generate a classifier capable of predicting behaviors based on the observed behaviors related to the processes running on the system. The system focuses on a subset of artifacts constructed from the events data to minimize the performance impact of detecting malware in real-time or near real-time. In some examples, the system may select strong features built for different behavioral activity patterns to minimize the number of features that are highly correlated to address a multi-collinearity problem which may negatively affect model performance. Thus, the system may generate a malware classifier that uses strong uncorrelated features of subsequences of behavioral events for each process in the any portion of the process tree regardless of the order of events or processes. The system may implement the malware classifier with any ML algorithm (e.g., linear regression (LR), random forests (RF), extreme gradient boosting (XGB), Bayesian new neoclassical synthesis (NNS), etc.) and transmit the ML malware classifier to the sensor component.

The sensor component may use the ML malware classifier to perform asynchronous behavioral detection on a host device and process system events for malware detection. The sensor component may use the ML malware classifier to monitor malicious behavior across multiple processes and multiple stages of the attack on the host device. In some examples, the sensor component may use the ML malware classifier to process system events for malware detection and to continue the uninterrupted execution of legitimate processes. The sensor component may detect an attack and take remedial action without pausing and/or stopping processes. The remedial action may include killing the malicious processes and removing all traces of the attack leaving legitimate processes untouched.

The security service system may include detection and filtering techniques to collect data for the events. The system may determine behavioral artifacts that include one or more events and indicates possible malicious behavior based on the events data.

As described herein, the host device may install and subsequently execute the sensor component as part of a security service system to monitor and record behavioral events and patterns on a plurality of computing devices in an effort to detect, prevent, and mitigate damage from malware or malicious attack. Upon installation on a host device, the sensor component may detect, record, and analyze events ("events data" or "data associated with the events") on the host device and/or the sensor component can send the recorded events to a remote portion of the security service system implemented in the "Cloud" (the "Cloud" also being referred to herein as a "remote security system,"). At the remote security system, the received events data can be further analyzed for purposes of detecting, preventing, and/ or defeating malware and attacks. The sensor component resides on the host device, observes and analyzes events that occur on the host device, and interacts with the remote security system to enable a detection loop that is aimed at defeating all aspects of a possible attack.

Some examples herein relate to detecting malware or malicious behavior, e.g., by recording events performed by programs and analyzing the "behaviors" associated with the events. As used herein, the term "behaviors" may include any filtered or unfiltered information captured from behavioral patterns. For brevity and ease of understanding, as used herein, "suspicious" refers to events or behavior determined using techniques described herein as being possibly indicative of attacks or malicious activity. The term "suspicious" does not imply or require that any moral, ethical, or legal judgment be brought to bear in determining suspicious events.

As used herein, the term "adversaries" includes, e.g., malware developers, exploit developers, builders, and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

Some examples relate to receiving or processing event stream(s) or sequence(s) indicating activities of system components such as processes or threads. Many system components, including malicious system components, perform a particular group of operations repeatedly. For example, a file-copy program repeatedly reads data from a source and writes data to a destination. In another example, a ransomware program repeatedly encrypts a file and deletes the un-encrypted original. Some examples relate to detecting such repetitions. Some examples locate repeated groups of operations based on detected events, permitting malware detection without requiring disassembly or other inspection of the code for that malware.

The systems, devices, and techniques described herein can be implemented in a number of ways. Example implementations are provided below with reference to the following figures.

Figure 1:
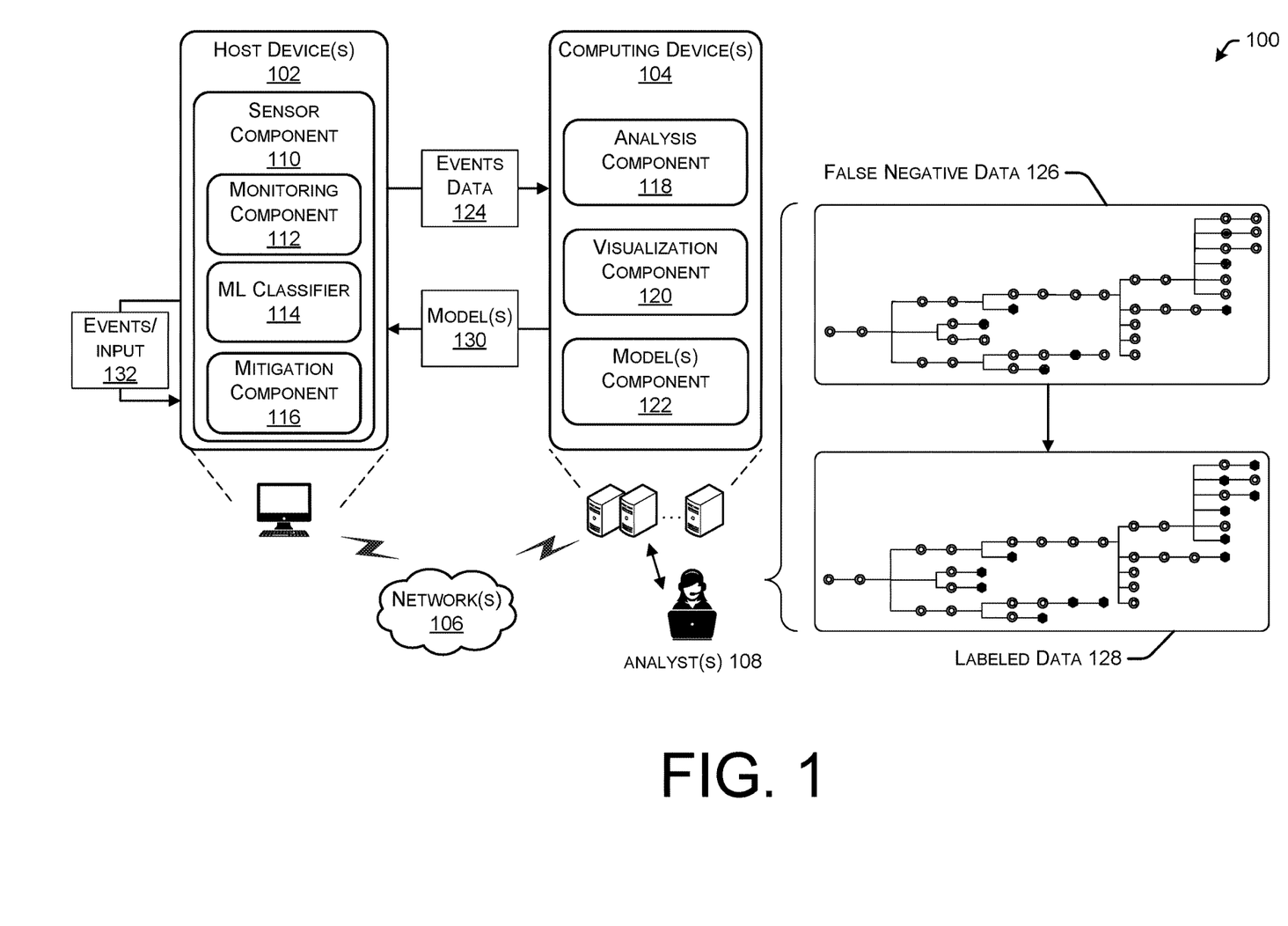
FIG. 1 illustrates an example system for a security service system that includes a machine learning malware classifier, trained on behavioral artifacts, to monitor a host device, as described herein.

FIG. 1 illustrates an example system 100 for a security service system that includes a machine learning malware classifier, trained on behavioral artifacts, to monitor a host device, as described herein. The system 100 may include a host device(s) 102 that interacts with a computing device(s) 104 of the security service system over a network(s) 106.

In some examples, the network(s) 106 may include any one or more networks, such as wired networks, wireless networks, and combinations of wired and wireless networks. Further, the network(s) 106 may include any one or combination of multiple different types of public or private networks (e.g., cable networks, the Internet, wireless networks, etc.). In some instances, the host device(s) 102 and the computing device(s) 104 communicate over the network(s) 106 using a secure protocol and/or any other protocol or set of protocols, such as the transmission control protocol/Internet protocol (TCP/IP).

The host device(s) 102 ("host machine," or "monitored device") may implement a sensor component 110 and associated components, which are stored in a memory of the host device(s) 102 and executable by one or more processors of the host device(s) 102. The host device(s) 102 may be or include any suitable type of host device(s) 102, including, without limitation, a mainframe, a work station, a personal computer (PC), a laptop computer, a tablet computer, a personal digital assistant (PDA), a cellular phone, a media center, an embedded system, or any other sort of device or devices. An entity (sometimes called "organization" or "customer") may be associated with a network of host devices, including the host device(s) 102, and the entity may have registered for security services provided by a service provider of the computing device(s) 104.

The host device(s) 102 may receive the sensor component 110 and associated components over the network(s) 106 from the computing device(s) 104 by downloading the sensor component 110 as a software package to be installed on the host device(s) 102. Together, the sensor component 110 of the host device(s) 102 and the computing device(s) 104 form a detection loop, which can be enabled by an agent architecture designed in accordance with the principles of the well-known OODA-loop (i.e., observe-orient-detect-act-loop). The sensor component 110 may include components that receive notifications of semantically-interesting behavioral events (e.g., file writes and launching executables) from host operating system hooks or filter drivers, from user mode behavioral events monitors, or from threads monitoring log files or memory locations. Thus, the sensor component 110 may observe behavioral events, determine actions to take based on those behavioral events, and/or send observed behavioral events to the computing device(s) 104 for further analysis and/or for training machine learning models.

The detected events observed by the sensor component 110 and associated components may be sent over the network(s) 106 to the computing device(s) 104, with or without further processing by the sensor component 110. For example, in some examples, the detected events observed by the sensor component 110 may be filtered to remove known safe behavioral events and/or to target malicious processes to help reduce the size of data transfer and then sent to the computing device(s) 104. Alternatively, the detected events can be sent to the computing device(s) 104 without further filtering on the host device(s) 102.

In some examples, the sensor component 110 may be connected to the computing device(s) 104 via a secure channel, such as a virtual private network (VPN) tunnel or other sorts of the secure channel, and may provide events data and/or behavioral events conveying security-relevant information to the computing device(s) 104 through the secure channel. The sensor component 110 may also receive configuration updates, instructions, remediation, etc., from the computing device(s) 104 via the secure channel.

The sensor component 110 may include a monitoring component 112, a machine learning (ML) classifier 114, and a mitigation component 116. The sensor component 110 and associated components may perform asynchronous behavioral detection on the host device(s) 102.

The monitoring component 112 may be configured to monitor behavioral events on the host device(s) 102 in kernel mode and/or user mode. The monitoring component 112 may generate events data corresponding to monitored operations targeted by the malicious attack and/or malware. To generate the events data, the monitoring component 112 may profile target malicious processes and register and/or capture changes. The profiling may include, but is not limited to, network traces, registry modifications, file system changes, memory access, and the like. Further, the monitoring component 112 may transmit events data to the computing device(s) 104. The sensor component 110 and the monitoring component 112 may continue to execute on the host device(s) 102 by observing and sending events data to the computing device(s) 104 while the host device(s) 102 is powered on and running.

In some examples, the monitoring component 112 may monitor the host device(s) 102 over a predetermined period of time and transmit the events data to the computing device(s) 104 for models training. The monitoring component 112 may observe and track interactions between processes and between system binaries (e.g., program files) and underlying system components (e.g., file system, registry, network, memory, etc.) for the predetermined period of time. The predetermined period of time may be any amount of time (e.g., one week, two weeks, one month, etc.) adequate for the security system to collect sufficient events data for sample monitoring and/or generate training data. The sensor component 110 and the monitoring component 112 may continuously send events data to the computing device(s) 104 to train new ML models, and the computing device(s) 104 may periodically (e.g., every three months, every six months, etc.) send new ML models to the sensor component 110 and associated components.

The machine learning (ML) classifier 114 may include one or more ML models for malware classification. As described herein, the security system on the computing device(s) 104 may train a malware classifier that uses strong uncorrelated features of subsequences of behavioral events for each process in the any portion of the process tree regardless of the order of events or processes. The security system may implement the malware classifier with any ML algorithm (e.g., LR, RF, XGB, NNs, etc.) and transmit the ML malware classifier to the sensor component 110. The machine learning (ML) classifier 114 may receive the ML malware classifier and implement the malware classification functions.

The mitigation component 116 may determine a remedial action for the host device(s) 102 based on the malware detection. The sensor component 110 may use the ML classifier 114 to monitor malicious behavior across multiple processes and multiple stages of the attack on the host device(s) 102. In some examples, the sensor component 110 may use the ML classifier 114 to process system events for malware detection and to continue the uninterrupted execution of legitimate processes. The sensor component 110 may detect an attack, and the mitigation component 116 may take remedial action without pausing and/or stopping processes. The remedial action may include killing the malicious processes and removing all traces of the attack leaving legitimate processes untouched.

In some examples, the mitigation component 116 may determine the remedial action may trigger varying levels of containment for the host device(s) 102 based on varying levels of suspicious behavioral events. In response to determining that the host device(s) 102 is compromised (e.g., behaviorally detecting malware), the sensor component 110 can send a containment notification over the network 106 to the computing device(s) 104. In various examples, the sensor component 110 may cause the host device(s) 102 to enable (activate, trigger, etc.) network containment. To enable network containment on the host device(s) 102, the sensor component 110 can implement a firewall policy included with the sensor component 110. Upon enforcement of the firewall policy, a firewall of the host device(s) 102 denies outgoing data packets from, and incoming data packets to, the host device(s) 102 that would have been allowed prior to the implementation of the firewall policy. In some examples, the firewall policy may deny all traffic to and from the host device(s) 102 with respect to other computing systems having remote network addresses (e.g., Internet Protocol (IP) addresses) that are not otherwise specified in the firewall policy as an exception for allowed traffic. In various examples, however, network containment can be implemented on the host device(s) 102 in a manner that allows some communication to/from the host device(s) 102 with the outside world over the network 106. For example, the firewall policy can specify exceptions for remote network addresses that are allowed to communicate with the host device(s) 102 after containment is enabled/initiated and while the host device(s) 102 remains contained. The firewall policy may allow some traffic to and from the computing device(s) 104 so that a communication channel remains open and usable between the host device(s) 102 and the computing device(s) 104, even when the host device(s) 102 is "contained" (or cutoff from communicating with the other host device(s) 102 besides the computing device(s) 104). To accomplish this result, the firewall policy can specify at least one remote network address (e.g., a remote IP address) associated with the computing device(s) 104 and may specify an action to allow outgoing data packets to and incoming data packets from, the computing device(s) 104, which may be associated with the at least one remote network address that can be specified in the firewall policy. In various examples, remedial actions may be taken with respect to the host device(s) 102, including remotely rebooting, shutting down, or disconnecting from the network, or another local or remote management operation can be taken with respect to those hosts.

In at least one configuration, the computing device(s) 104 may include any components that may be used to collect and analyze the observed behavioral events received from the host device(s) 102, to report on suspicious behavioral events, and to mitigate any malware or malicious code found in the host device(s) 102. For example, the computing device(s) 104 may include an analysis component 118, a visualization component 120, and a model(s) component 122.

The analysis component 118 may receive and store any client entity information and their associated security information, including observed behavioral events received from the sensor component 110 on the host device(s) 102. Additionally, the analysis component 118 may gather data from various sources for use with other components. For example, the analysis component 118 may gather enrichment data to help provide context to observed behavioral events. The analysis component 118 may receive events detected from the host device(s) 102 and may aggregate the events per device into a plurality of events.

The analysis component 118 may receive events data to determine if the host device(s) 102 is potentially compromised. In some examples, the analysis component 118 may determine whether the host device(s) 102 is potentially compromised based on analyzing events data for behavioral events. The analysis component 118 may determine whether the behavioral events observed by the sensor component 110 are associated with malicious code or indicators of attack. In some examples, the analysis component 118 may analyze the observed behavioral events, including cross-machine activities, to determine if a second host device connected to the host device(s) 102 is potentially compromised.

The analysis component 118 may identify activity patterns from events detected at the host device(s) 102. A pattern may include only a single event and is a particular type of event that indicates some suspicious (potentially malicious) activity was carried out. The patterns may be detected based on any predetermined criterion to identify detected events that indicate that one or more events of the plurality of events may indicate suspicious and/or potentially malicious activity was occurring. The analysis component 118 can detect a portion of the plurality of events, including any read and write operations, and other operations, as a pattern.

In some examples, the analysis component 118 may map individual events onto a behavioral activity pattern. The analysis component 118 may determine individual events from a portion of events data is associated with malicious behavior and may map the individual events onto a behavioral activity pattern. To map the individual events, the analysis component 118 may aggregate multiple "individual events" into a single artifact. By aggregating multiple events associated with the malicious behavior, the analysis component 118 may generate multiple artifacts associated with the malicious behavior. The analysis component 118 may focus on a specific class of artifacts (e.g., "behavioral artifact," also referred to herein as "behaviors") from the multiple artifacts. The behaviors may include filtered or unfiltered information captured by behavioral activity patterns. Using behavioral artifacts, the present system may identify behaviors and associated captured information for the malicious process rather than isolated single events.

The analysis component 118 may monitor events data to generate a process tree. In some examples, the analysis component 118 may use the events data to track processes and determine relationship information associated with any portion of a process tree (e.g., information associated with an immediate parent and/or grandparent of a process). The analysis component 118 may aggregate the data for any portion of the process tree and may generate an associated feature vector ("behavioral activity pattern") including behaviors from all or a subset of processes that participated in the malicious activity and/or malware replication. In various examples, the subset of processes may be defined by a "sliding process window" (e.g., 5 seconds, 10 seconds, 60 seconds, 5 minutes, 30 minutes, 1 hour, 24 hours, 1 week, 1 month, etc.).

As described herein, the analysis component 118 may determine a behavioral activity pattern based on aggregating multiple events produced by a malicious process. As described herein, the analysis component 118 may aggregate multiple events to produce a single artifact that may be associated with a behavior. The analysis component 118 may determine a total number of processes and/or a total number of certain classes of artifacts (behaviors) triggered during sample monitoring. In some examples, the analysis component 118 may determine behavioral activity patterns based on different time intervals and/or "sliding process window" (e.g., 5 seconds, 10 seconds, 60 seconds, 5 minutes, 30 minutes, 1 hour, 24 hours, 1 week, 1 month, etc.). In various examples, the sliding process window may be associated with a start time and an end time.

In some examples, analysis component 118 can determine that the plurality of events is associated with an incident indicating malicious behavior based on the fidelity score. The analysis component 118 may generate an alert and/or a visualization for the incident. In various examples, the analysis component 118 may determine to take remedial actions with respect to the host device(s) 102 having scores above a predetermined threshold. For example, the analysis component 118 may transmit commands to the host device(s) 102, via the sensor component 110 and/or the mitigation component 116, and the host device(s) 102 can be remotely rebooted, shut down, or disconnected from the network, or another local or remote management operation can be taken with respect to the host device(s) 102.

The visualization component 120 may enable a security analyst 108 (also referred to as an administrator, support personnel, etc.) associated with the computing device(s) 104 to view alerts based on incidents detected and visualization of the incidents, alerts pertaining to the host device(s) 102 that have been compromised, and to make decisions regarding appropriate responses to those incident detections and alerts.

In some examples, the visualization component 120 may present events data with an alert to review the incidents. The visualization component 120 may present events data, including false-negative or false-positive data, with a number of events and/or alerts that needed the security analyst 108 to review. The security analyst 108 may determine to relabel one or more processes in the false-negative or false-positive data to generate the labeled data. In various examples, the labels of the labeled data may include "features" based on observed behaviors related to the one or more processes and/or "maliciousness" of files and/or input data. The visualization component 120 may store the labeled data as training data in a database, including a corpus of malware.

The model(s) component 122 may train one or more machine learning models. The model(s) component 122 may use the corpus of malware, labeled by the security analyst 108, as training data and apply ML classification techniques to generate a classifier capable of predicting the behaviors related to the processes running on the system. The model(s) component 122 may focus on a subset of artifacts constructed off the events data to minimize the performance impact of detecting malware in real-time or near real-time. In some examples, the model(s) component 122 may select strong features built for different behavioral patterns to minimize the number of features that are highly correlated to address a multi-collinearity problem which may negatively affect model performance. The model(s) component 122 may generate a malware classifier that uses strong uncorrelated features of subsequences of behavioral events for each process in the any portion of the process tree regardless of the order of events or processes. In some examples, the model(s) component 122 may implement the malware classifier with any ML algorithm (e.g., LR, RF, XGB, NNs, etc.) and transmit the ML malware classifier ("ML model(s)") to the sensor component. In some examples, the model(s) component 122 may generate behavioral artifacts to perform asynchronous behavioral detection.

In a non-limiting example, the visualization component 120 may present example false-negative data 126 with an alert to review the incidents. The example false-negative data 126 may depict events data having a number of events that were incorrectly labeled as "false-negative" or "false-positive" and needed the security analyst 108 to review and/or correct. The security analyst 108 may determine to relabel one or more processes in the example false-negative data 126 to generate the example labeled data 128. The visualization component 120 may store the example labeled data 128 as training data in a database, including a corpus of malware.

The model(s) component 122 may generate a malware classifier that uses strong uncorrelated features of subsequences of behavioral events for each process in the any portion of the process tree regardless of the order of events or processes. In some examples, the model(s) component 122 may implement the malware classifier with any ML algorithm (e.g., LR, RF, XGB, NNs, etc.). As described herein, the model(s) component 122 may generate behavioral artifacts to perform asynchronous behavioral detection. In the present non-limiting example, the model(s) component 122 may generate example ML model(s) 130, including an example behavioral artifact indicating malicious behavior associated with Behavior_A, Behavior_B, and Behavior_C occurring within a window of 5 minutes. The computing device(s) 104 may transmit the example ML model(s) 130 to the sensor component 110 on the host device(s) 102.

In the present example, the sensor component 110 may receive and implement the example ML model(s) 130. Rather than send all events data to the computing device(s) 104 for processing, the sensor component 110 using the ML classifier 114 may monitor events data, including example events/input 132. The sensor component 110 may determine the example events/input 132 indicates Behavior_A, Behavior_B, and Behavior_C occurred within a 5-minute window. Regardless of other different events and/or processes in the example events/input 132, during the 5-minute window, the sensor component 110 may flag the behaviors in the example events/input 132 as malicious. The mitigation component 116 may determine a remedial action based the malware detection.

Figure 2:
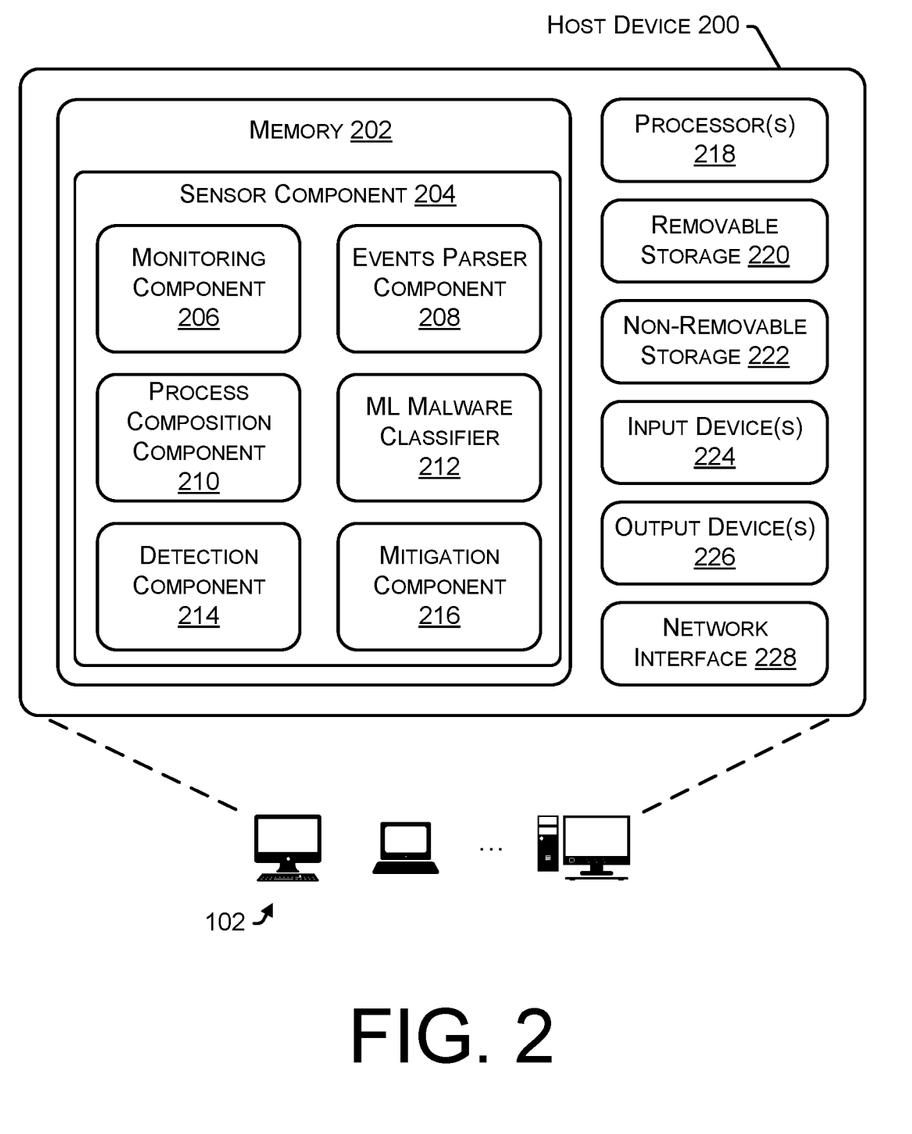
FIG. 2 is a block diagram of an illustrative computing architecture of a host device.

FIG. 2 is a block diagram of an illustrative computing architecture of a host device 200. In some embodiments, the host device 200 can correspond to the host device(s) 102 of FIG. 1. It is to be understood in the context of this disclosure that the host device 200 can be implemented as a single device or as a plurality of devices with components and data distributed among them. By way of example, and without limitation, the host device 200 can be implemented as various host devices 200(1), 200(2), . . . , 200(N).

As illustrated, the host device 200 comprises a memory 202 storing a sensor component 204 and associated components. Also, the host device 200 includes processor(s) 218, a removable storage 220 and non-removable storage 222, input device(s) 224, output device(s) 226, and network interface 228.

In various embodiments, memory 202 is volatile (such as RAM), non-volatile (such as ROM, flash memory, etc.) or some combination of the two. The sensor component 204 and associated components stored in the memory 202 can comprise methods, threads, processes, applications or any other sort of executable instructions. The sensor component 204 and associated components can also include files and databases.

In various embodiments, the computer-readable memory 202 generally includes both volatile memory and non-volatile memory (e.g., RAM, ROM, EEPROM, Flash Memory, miniature hard drive, memory card, optical storage, magnetic cassettes, magnetic tape, magnetic disk storage, or other magnetic storage devices, or any other medium). The computer-readable memory 202 may also be described as computer storage media or non-transitory computer-readable media and may include volatile and non-volatile, removable and non-removable media implemented in any method or technology for storage of information, such as computer-readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the desired information and which can be accessed by the security service system. Any such memory 202 may be part of the security service system.

The sensor component 204 may include a monitoring component 206, an events parser component 208, a process analysis component 210, a machine learning malware classifier 212, a detection component 214, and a mitigation component 216. The sensor component 204 may receive and store any user input and/or events data, including behavior artifacts received from associated components and processes on the host device 200. The sensor component 204 may gather data from associated components that may be stored in a data store.

In some instances, the sensor component 204 can correspond to the sensor component 110 of FIG. 1.

The monitoring component 206 may be configured to monitor behavioral events on the host device 200 in kernel mode and/or user mode. The monitoring component 206 may generate events data corresponding to monitored operations targeted by a malicious attack and/or malware, and the sensor component 204 may transmit the events data to the computing device 300 to be used for analysis and/or training data. To generate the events data, the monitoring component 206 may profile target malicious processes and register and/or capture changes, including, but is not limited to, network traces, registry modifications, file system changes, memory access, and the like. Further, the monitoring component 206 may transmit events data to the computing device 300. The sensor component 204 and the monitoring component 206 may continue to execute on the host device 200 by observing and sending events data to the computing device 300 while the host device 200 is powered on and running.

In some examples, the monitoring component 206 may monitor the host device 200 over a predetermined period of time and transmit the events data to the computing device 300 for models training. The monitoring component 206 may observe and track interactions between processes and between system binaries (e.g., program files) and underlying system components (e.g., file system, registry, network, memory, etc.) for the predetermined period of time. The predetermined period of time may be any amount of time (e.g., one week, two weeks, one month, etc.) adequate for the security system to collect sufficient events data for training data. The sensor component 204 and the monitoring component 206 may continuously send events data to the computing device 300 to train new ML models, and the computing device 300 may periodically (e.g., every 3 months, every 6 months, etc.) send new ML models to the sensor component 204 and associated components.

In some instances, the monitoring component 206 can correspond to the monitoring component 112 of FIG. 1.

The events parser component 208 may receive and process events data. As described herein, the system may generate event data corresponding to monitored operations performed by malware. The events parser component 208 may generate event data by profiling target malicious processes and registering and/or capturing changes in the environment. The changes may include, but is not limited to: network traces, registry modifications, file system changes, and memory access.

In some examples, the events parser component 208 may determine that not all behavioral events are equally important and may combine events captured by the sensor component 204.

The process analysis component 210 may map individual events onto a behavioral activity pattern. The process analysis component 210 may also track processes and determine relationship information associated with any portion of a process tree (e.g., information associated with an immediate parent and/or grandparent of a process). The sensor component 204, the events parser component 208, and the process analysis component 210 may generate events data corresponding to monitored operations targeted by a malicious attack and/or malware. To generate the events data, the process analysis component 210 may profile target malicious processes and register and/or capture changes, including, but is not limited to, network traces, registry modifications, file system changes, memory access, and the like.

The machine learning (ML) classifier 212 may include one or more ML models for malware classification. As described herein, the security system on the computing device 300 may train a malware classifier that uses strong uncorrelated features of subsequences of behavioral events for each process in the any portion of the process tree regardless of the order of events or processes. The security system may implement the malware classifier with any ML algorithm (e.g., LR, RF, XGB, NNs, etc.) and transmit the ML malware classifier to the sensor component 204. The machine learning (ML) classifier 212 may receive the ML malware classifier and implement the malware classification functions. The ML malware classifier may classify input data by features indicating malware.

In some instances, the machine learning (ML) classifier 212 can correspond to the machine learning (ML) classifier 114 of FIG. 1.

The detection component 214 may determine if the host device 200 is potentially compromised. Determining whether the host device 200 is potentially compromised may include determining whether the activity patterns observed by the sensor component 204 are associated with malicious code or indicators of attack. In some embodiments, the events parser component 208 may analyze the observed activity patterns that include cross-machine activity patterns to determine if the host device 200 is potentially compromised. In various embodiments, the events parser component 208 may analyze the observed activity patterns within a predefined time period that may be set to a default time period and may be modified by the analyst. The events parser component 208 may store all activities data as historical data that may be accessed by the analyst for further analysis.

In some embodiments, the detection component 214 may also maintain and utilize one or more models from the ML malware classifier 212, such as models specific to an individual host device 200, to types of computing devices, to entities, or to a generic device to determine which activity patterns are "interesting" and may warrant additional analysis from the analyst. For example, while a host A machine remoting into a host B machine to run an executable file may be an "interesting" event, if the host A machine ran the same file on a hundred machines belonging to the same entity, this may be normal administrative behavior. Thus, the detection component 214 may filter the observed activity patterns received from sensor component 204 to remove the many legitimate user activity patterns to isolate "interesting" filtered activity patterns. The security service system may update these models based on the received notifications and utilize the models in analyzing the interesting activity patterns. In some embodiments, the detection component 214 and the mitigation component 216 may utilize a machine learning model (or algorithm) that is trained on a past corpus of behavioral activity patterns and detected malware attacks/intrusions on the host device 200 that utilized the security service system.

The mitigation component 216 may generate alerts for an analyst to further investigate a possible attack on a host device 200 or generate notifications of interesting activity patterns that need further analysis. The mitigation component 216 may determine a remedial action for the host device 200 based on the malware detection and/or based at least in part on determining a feature that indicates the malware. The sensor component 204 may use the ML classifier 212 to monitor malicious behavior across multiple processes and multiple stages of the attack on the host device 200. In some examples, the sensor component 204 may use the ML classifier 212 to process system events and/or user input for malware detection and to continue the uninterrupted execution of legitimate processes. The sensor component 204 may detect an attack, and the mitigation component 216 may take remedial action without pausing and/or stopping processes. The remedial action may include terminating the malicious processes and removing all traces of the attack leaving legitimate processes untouched.

In some instances, the mitigation component 216 can correspond to the mitigation component 116 of FIG. 1.

In some instances, any or all of the devices and/or components of the host device 200 may have features or functionality in addition to those that FIG. 2 illustrates. For example, some or all of the functionality described as residing within any or all of the computing device(s) 104, 300 of the security service system may reside remotely from that/those host device 200, in some implementations.

The host device 200 may be configured to communicate over a telecommunications network using any common wireless and/or wired network access technology. Moreover, the host device 200 may be configured to run any compatible device operating system (OS), including but not limited to, Microsoft Windows Mobile, Google Android, Apple iOS, Linux Mobile, as well as any other common mobile device OS.

The host device 200 also can include input device(s) 224, such as a keypad, a cursor control, a touch-sensitive display, voice input device, etc., and output device(s) 226, such as a display, speakers, printers, etc. These devices are well known in the art and need not be discussed at length here.

As illustrated in FIG. 2, the host device 200 also includes the network interface 228 that enables the computing device 300 of the security service system to communicate with other computing devices, such as any or all of the host device(s) 102, the computer device(s) 104, and/or the computing device 300.

Figure 3:
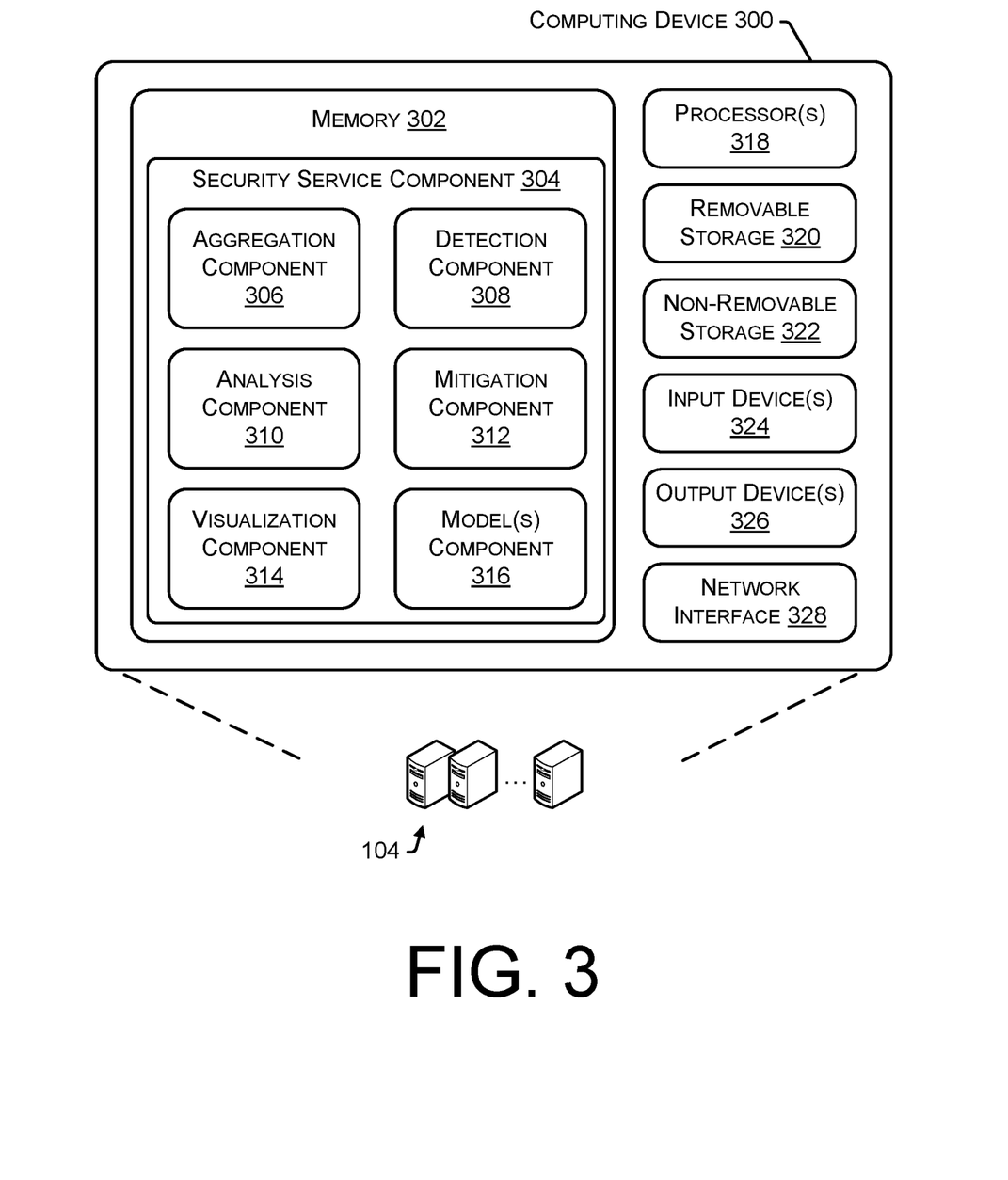
FIG. 3 is a block diagram of an illustrative computing architecture of a computing device.

FIG. 3 is a block diagram of an illustrative computing architecture of the computing device(s) 300. In some examples, the computing device(s) 300 can correspond to the computing device(s) 104 of FIG. 1. It is to be understood in the context of this disclosure that the computing device(s) 300 can be implemented as a single device or as a plurality of devices with components and data distributed among them. By way of example, and without limitation, the computing device(s) 300 can be implemented as various computing devices 300(1), 300(2), . . . , 300(N).

As illustrated, the computing device(s) 300 comprises a memory 302 storing a security service component 304, an aggregation component 306, a detection component 308, an analysis component 310, a mitigation component 312, a visualization component 314, and a model(s) component 316. Also, the computing device(s) 300 includes processor(s) 318, a removable storage 320 and non-removable storage 322, input device(s) 324, output device(s) 326, and network interface 328.

In various examples, memory 302 is volatile (such as RAM), non-volatile (such as ROM, flash memory, etc.), or some combination of the two. The security service component 304, the aggregation component 306, a detection component 308, an analysis component 310, a mitigation component 312, a visualization component 314, and a model(s) component 316 stored in the memory 302 can comprise methods, threads, processes, applications or any other sort of executable instructions. The aggregation component 306, a detection component 308, an analysis component 310, a mitigation component 312, a visualization component 314, and a model(s) component 316 can also include files and databases.

In various examples, the computer-readable memory 302 generally includes both volatile memory and non-volatile memory (e.g., RAM, ROM, EEPROM, Flash Memory, miniature hard drive, memory card, optical storage, magnetic cassettes, magnetic tape, magnetic disk storage, or other magnetic storage devices, or any other medium). The computer-readable memory 302 may also be described as computer storage media or non-transitory computer-readable media and may include volatile and non-volatile, removable and non-removable media implemented in any method or technology for storage of information, such as computer-readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the desired information and which can be accessed by the security service system. Any such memory 302 may be part of the security service system.

The security service component 304 includes the aggregation component 306, a detection component 308, an analysis component 310, a mitigation component 312, a visualization component 314, and a model(s) component 316. The security service system and associated components may configure a sensor component (e.g., the sensor component 110, 204), including an ML malware classifier, to perform asynchronous behavioral detection on host devices (e.g., host device(s) 102, 200).

The aggregation component 306 may receive and store any client entity information and their associated security information, including observed behavioral events received from the sensor component 204 on the host device 200. The aggregation component 306 may gather data from other components that may be stored in a data store. In some examples, the aggregation component 306 may gather and store data associated with known information, such as domain information that is associated with known entities, for use as enrichment data by the visualization component 314.

In some examples, the aggregation component 306 may receive and collect events data for training data. The aggregation component 306 may interact with the detection component 308 and the analysis component 310 to map individual events from events data onto a behavioral activity pattern and generate process trees. By mapping the individual events, the aggregation component 306 may aggregate multiple events, that are produced by the malicious process, into a single artifact. The "single artifact" enables the analysis component 310 to identify behaviors associated with a malicious process rather than isolated single events. The aggregation component 306 may also track processes and determine relationship information associated with any portion of a process tree (e.g., information associated with an immediate parent and/or grandparent of a process). The aggregation component 306 may aggregate data for the any portion of the process tree and may generate an associated feature vector, including behaviors from all processes that participated in the malicious activity and/or malware replication.

The detection component 308 may receive events data from a host device and may determine to train an ML model for behavioral detection at the host device. As previously discussed, the behavioral events observed by the sensor component 110 may be filtered using first configurable filters of the sensor component 110 to remove known safe behavioral events to help reduce the size of data transfer, or the behavioral events may be sent to the security service system without further processing on the host device 200. The detection component 308 may have one or more configurable filters, including filtering rules set by the analyst.

In some examples, the detection component 308 may also maintain and utilize one or more situational models to determine which behavioral events are "interesting" and may warrant additional analysis from the analyst. In some examples, the detection component 308 may filter the observed behavioral events received from sensor component 204 to remove the many legitimate user behavioral events to isolate "interesting" filtered behavioral events. The security service system may update these models based on the received notifications and utilize the models in analyzing the interesting behavioral events. In some examples, the detection component 308 and the model(s) component 316 may utilize a machine learning model (or algorithm) that is trained on a past corpus of behavioral events and detected malware attacks/intrusions on the host device 200 that utilized the security service system. In some examples, a machine learning model may be configured to process behavioral events received from a host device 200 as input, and to generate an output of malware classifier that is utilized by components of the security service system in analyzing the behavioral events on the host device 200. In additional examples, a machine learning model is configured to process behavioral events received from a host device 200 as input, and to generate an output of filtered behavioral events that are utilized by components of the security service system in analyzing the severity of the threat on the host device 200.

In some examples, the detection component 308 may classify the severity level for the filtered activity depending on the activity pattern type, based on whether that particular activity pattern type is a stronger indication of attack. That is, an activity pattern with explicit threat data showing obvious suspicious activity pattern on a remote system may be classified as a high severity level, while an activity pattern with inferred threat data showing signs of suspicious activity pattern may be classified as a medium severity level.

The analysis component 310 may determine if the host device 200 is potentially compromised. Determining whether the host device 200 is potentially compromised may include determining whether the behavioral events observed by the sensor component 204 are associated with malicious code or indicators of attack. In some examples, the analysis component 310 may analyze the observed behavioral events that include cross-machine behavioral events to determine if the host device 200 are potentially compromised. In various examples, the analysis component 310 may analyze the observed behavioral events within a predefined time period that may be set to a default time period and may be modified by the analyst. The analysis component 310 may store all activities data as historical data that may be accessed by the analyst for further analysis.

In some instances, the analysis component 310 can correspond to the analysis component 118 of FIG. 1.

The analysis component 310 may further aggregate incident scores to provide a better overview of the situation. The analysis component 310 determines a fidelity score for each of the host device 200 based at least in part on the filtered behavioral events from the detection component 308, the time period of the observed activity pattern, and the classification of severity level. If the fidelity score is above a predetermined severity threshold, an alert for an analyst may be generated for further analysis. In some examples, the fidelity score for a host device may be based on the cardinality of the set of interesting behavioral events associated with the host device within a predefined time period. That is, the fidelity score is the number of behavioral events in the set. Additionally and/or alternatively, the fidelity score for a host device may be based on the severity level of the filtered behavioral events associated with the host device, such that if even one of the behavioral events is classified as high severity level, the fidelity score may be set to a value higher than the predetermined severity threshold. In various examples, the severity levels may be assigned a corresponding weight, and the fidelity score may be a tally of the behavioral events modified by the weight. In some examples, the analysis component 310 may increase a first fidelity score on a first host device by at least a portion of a second fidelity score of a second host device that is acting remotely on the first host device. Additionally, and/or alternatively, host devices with "interesting" remoting behavioral events between them may be grouped together into a group of behavioral events and a fidelity score may be determined for the group. The group fidelity score may be based on the highest fidelity score for any one device in the group, or may be based on the cardinality of the set of filtered behavioral events associated with all the devices in the group.

The mitigation component 312 may generate alerts for an analyst to further investigate a possible attack on a host device 200 or generate notifications of interesting behavioral events that need further analysis. Additionally, to help draw attention to high severity level behavioral events or activity pattern groups, the mitigation component 312 may establish a threat alert priority scheme to help prioritize the presentation of behavioral events and alerts. The threat alert priority scheme may be based on the fidelity score, severity level, alert timeline, or any combination thereof. For example, the behavioral events and alerts may be ranked according to their severity level, followed by fidelity scores, so that the behavioral events and alerts with highest severity level are presented first, sorted by the highest fidelity scores first; then the next severity level is presented, sorted by the highest fidelity scores first.

The visualization component 314 may enable an analyst, who is associated with the security service system, to view notifications of observed behavioral events, alerts pertaining to the host device 200 that have been compromised, and make decisions regarding appropriate responses to those behavioral events and alerts.

The visualization component 314 may present events data with an alert to review the incidents. The visualization component 314 may present events data including false-negative data with a number of events and/or alerts that needed the security analyst to review. The security analyst may determine to relabel one or more processes in the false-negative data to generate the labeled data. The system may determine, based on the labeled indicator, that a portion of the training data include the false negative data. The visualization component 314 may store the labeled data as training data in a database, including a corpus of malware.

The visualization component 314 may further present selection elements that, upon selection, automatically generate a client report by populating at least a portion of a client report including some of the augmented data for the client entity associated with the host device 200 in question. In some examples, the analyst may complete the remaining client report before sending the report to the host device 200 or entity associated with the host device 200. In this example, there may be instances where the analyst notices an alert of a potentially compromised host device 200 in the visualization component 314, but after further inspection (e.g., by viewing further details about the activity pattern on the host device 200), the analyst may determine, above some threshold level of confidence, that the host device 200 is actually, or most likely, not compromised by malware, and may decide to refrain from reporting the host device 200.

In other examples, the visualization component 314 may be configured to determine to surface a particular host device 200 automatically (i.e., without human intervention), and may send non-confidential behavioral events alert to the particular host device 200 without human intervention as well. The visualization component 314 may present the alerts and notifications to the client entity utilizing any communication channel, such as an e-mail message, a website associated with the security service system, a text message, a push notification, a social network site, an application that is associated with the security service system and that resides on the host device 200 associated with the client entity.

In some instances, the visualization component 314 can correspond to the visualization component 120 of FIG. 1.

The model(s) component 316 may communicate with the sensor component 204 of the host device 200, and to evaluate suspicious behavioral events identified by the sensor component 204. For example, the security service system may be configured to receive behavioral events and data related to such behavioral events, such as forensic data associated with observed behavioral events. Upon receiving notification of an interesting activity pattern from a sensor component 204, the model(s) component 316 may determine if related notifications have been received from other sensor component 204 of other host device 200. Additionally, and/or alternatively, the model(s) component 316 may evaluate the interesting activity pattern based on one or more rules or heuristics. The model(s) component 316 and the detection component 308 may determine to train one or more machine learning model(s) to perform asynchronous behavioral detection on the host device 200.

Machine learning generally involves processing a set of examples (called "training data") in order to train the machine learning model(s). A machine learning model, once trained, is a learned mechanism that can receive new data as input and estimate or predict a result as output. For example, a trained machine learning model can comprise a classifier that is tasked with classifying unknown input (e.g., an unknown behavioral events) as one of the multiple class labels (e.g., a class label of "compromised" vs. "uncompromised", "high severity level" vs. "low severity level", etc.). Any single machine learning model, or an ensemble of base-level machine learning models, can be used for this purpose, including, without limitation, tree-based models, support vector machines (SVMs), kernel methods, neural networks, random forests (RF), extreme gradient boosting (XGB), splines (e.g., multivariate adaptive regression splines), hidden Markov model (HMMs), Kalman filters (or enhanced Kalman filters), Bayesian networks (or Bayesian belief networks), Bayesian new neoclassical synthesis (NNS), expectation-maximization, genetic algorithms, linear regression (LR) algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The model(s) component 316 may use a labeled corpus of malware to produce a classifier to predict observed behaviors related to the processes running on the system. The labeled corpus of malware may include training data labeled by an analyst based on the "maliciousness" (e.g., "high severity level" or "low severity level") of a file and/or input data. The model(s) component 316 may focus on a subset of artifacts constructed from events data to minimize the performance impact of detecting malware in real-time using multiple data points. By not using all the events data generated during sampling, the model(s) component 316 minimizes the number of features to help reduce computational overhead.

The model(s) component 316 may determine that an interesting activity pattern may be associated with malicious attack based on these determinations and evaluations and may, in response, perform any or all of generating an activity pattern and providing the activity pattern to host device 200 (e.g., for containment purposes, and/or diagnostic, healing, or other purposes), sending updates (e.g., a new version of the sensor component 204, new signatures, new firewall policies, etc.), instructing the host device 200 to perform a remedial action to heal the host device 200 or otherwise counter malicious code. In various examples, the model(s) component 316 may send a containment instruction, to a sensor component 204 residing on a host device 200, to specify an action to block a specific "interesting" activity pattern observed. For example, if the model(s) component 316 determines that there is a malicious process running cross-machine between a host device 200, the model(s) component 316 may send instructions to block that activity pattern.

In some instances, any or all of the devices and/or components of the computing device(s) 300 may have features or functionality in addition to those that FIG. 2 illustrates. For example, some or all of the functionality described as residing within any or all of the computing device(s) 300 of the security service system may reside remotely from that/those computing device(s) 300, in some implementations.

The computing device(s) 300 may be configured to communicate over a telecommunications network using any common wireless and/or wired network access technology. Moreover, the computing device(s) 300 may be configured to run any compatible device operating system (OS), including but not limited to, Microsoft Windows Mobile, Google Android, Apple iOS, Linux Mobile, as well as any other common mobile device OS.

The computing device(s) 300 also can include input device(s) 324, such as a keypad, a cursor control, a touch-sensitive display, voice input device, etc., and output device(s) 326, such as a display, speakers, printers, etc. These devices are well known in the art and need not be discussed at length here.

As illustrated in FIG. 3, the computing device(s) 300 also includes the network interface 328 that enables the computing device(s) 300 of the security service system to communicate with other computing devices, such as any or all of the host device(s) 102, 200.

Figure 4:
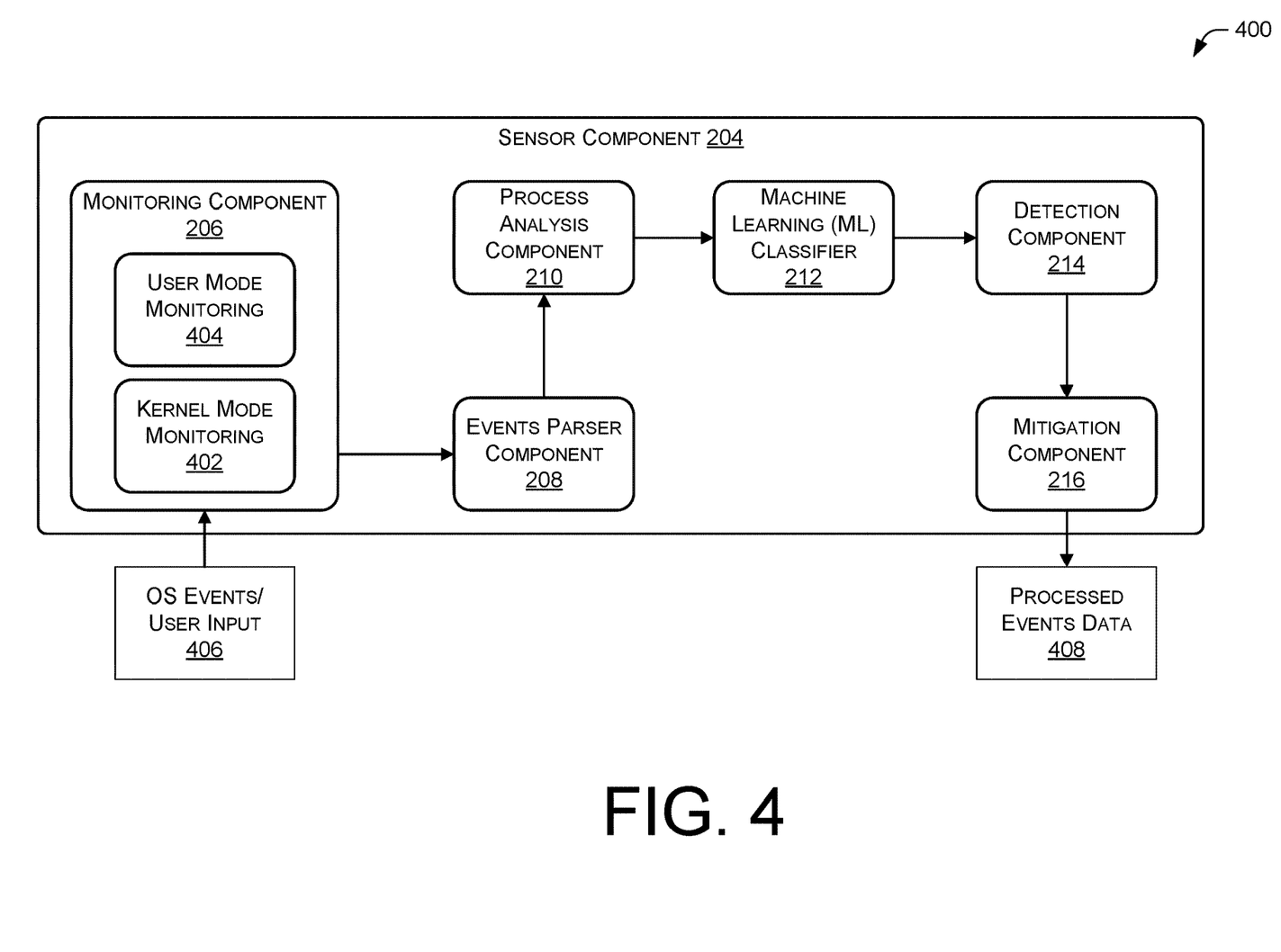
FIG. 4 illustrates an example signal flow for the sensor component and associated components, as discussed herein.

FIG. 4 illustrates an example signal flow 400 for the sensor component and associated components. As described herein with respect to FIG. 2, the sensor component 204 includes the monitoring component 206, the events parser component 208, the process analysis component 210, the machine learning malware classifier 212, the detection component 214, and the mitigation component 216.

The monitoring component 206 may include a kernel mode monitoring 402 and a user mode monitoring 404.

In some instances, the example OS events/user input 406 may be received by the monitoring component 206 via the kernel mode monitoring 402 or the user mode monitoring 404. As described herein, the monitoring component 206 may be configured to monitor behavioral events on the host device 200 in kernel mode and/or user mode.

The events parser component 208 may receive the example OS events/user input 406 and process the input to events data.

The process analysis component 210 may map events data onto a behavioral activity pattern. The machine learning (ML) classifier 212 may use a malware classifier to classify the events data. The detection component 214 may determine if the host device 200 is potentially compromised based on the classification of the events data. The mitigation component 216 may determine a remedial action for the host device 200 based on a malware detection.

In some examples, the sensor component 204 may transmit the example processed events data 408 to the computing device 300 for training data.

Figure 5:
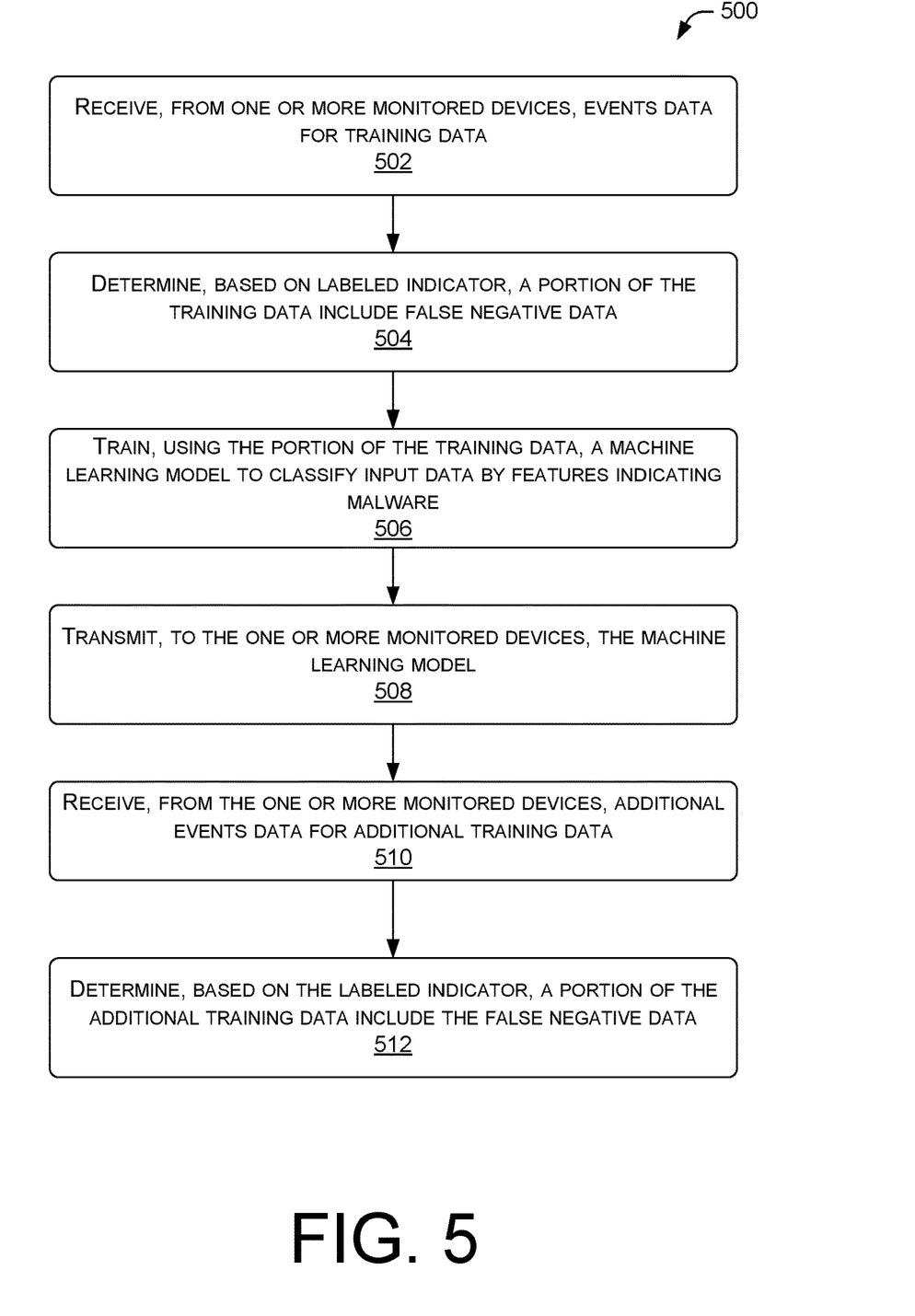
FIG. 5 illustrates an example process for training and deploying a machine learning (ML) malware classifier using behavioral artifacts, as discussed herein.

FIG. 5 is a flowchart depicting an example process 500 for training and deploying a machine learning (ML) malware classifier using behavioral artifacts, as discussed herein. Some or all of the process 500 may be performed by one or more components in FIGS. 1, 2, and 3, as described herein. For example, some or all of process 500 may be performed by the host device(s) 102, 200 and the computing device(s) 104, 300.

At operation 502, the process may include receiving, from one or more monitored devices, events data for training data. For instance, the computing device(s) 104 may receive events data for training data from the host device(s) 102. In some examples, the aggregation component may receive and collect events data for training data. The aggregation component may interact with the detection component and the analysis component to map individual events from events data onto a behavioral activity pattern and generate process trees. By mapping the individual events, the aggregation component may aggregate multiple events, that are produced by the malicious process, into a single artifact.

At operation 504, the process may include determining, based on labeled indicator, a portion of the training data include false negative data. For instance, the computing device(s) 104 or the host device(s) 102 may determine, based on labeled indicator, a portion of the training data include false negative data. The visualization component may present events data including false negative data with a number of events and/or alerts that needed the security analyst to review. The security analyst may determine to relabel one or more processes in the false negative data to generate the labeled data. The visualization component may store the labeled data as training data in a database including a corpus of malware.

At operation 506, the process may include training, using the portion of the training data, a machine learning model to classify input data by features indicating malware. In various examples, the computing device(s) 104 or the host device(s) 102 may train, using the portion of the training data, a machine learning model to classify input data by features indicating malware. The visualization component may store the labeled data as training data in a database including a corpus of malware. The model(s) component may train one or more machine learning models. The model(s) component may use the corpus of malware, labeled by the security analyst, as training data and apply ML classification techniques to generate a classifier capable of predicting behaviors based on the observed behaviors related to the processes running on the system.

At operation 508, the process may include transmitting, to the one or more monitored devices, the machine learning model. For instance, the computing device(s) 104 may transmit, to the host device(s) 102, the machine learning model. The model(s) component may generate a malware classifier that uses strong uncorrelated features of subsequences of behavioral events for each process in the any portion of the process tree regardless of the order of events or processes. In some examples, the model(s) component may implement the malware classifier with any ML algorithm (e.g., LR, RF, XGB, NNs, etc.) and transmit the ML malware classifier ("ML model(s)") to the sensor component.

At operation 510, the process may include receiving, from the one or more monitored devices, additional events data for additional training data. For instance, the computing device(s) 104 may receive, from the host device(s) 102, additional events data for additional training data. The sensor component and the monitoring component may continuously send events data to the computing device(s) 104 to train new ML models, and the computing device(s) 104 may periodically (e.g., every 3 months, every 6 months, etc.) send new ML models to the sensor component and associated components At operation 512, the process may include determining, based on the labeled indicator, a portion of the additional training data include the false negative data. For instance, the computing device(s) 104 or the host device(s) 102 may determine, based on the labeled indicator, a portion of the additional training data include the false negative data. In some examples, the system may determine based on the labeled indicator, that a portion of the training data include the false negative data. The visualization component may store the labeled data as training data in a database including a corpus of malware.

Figure 6:
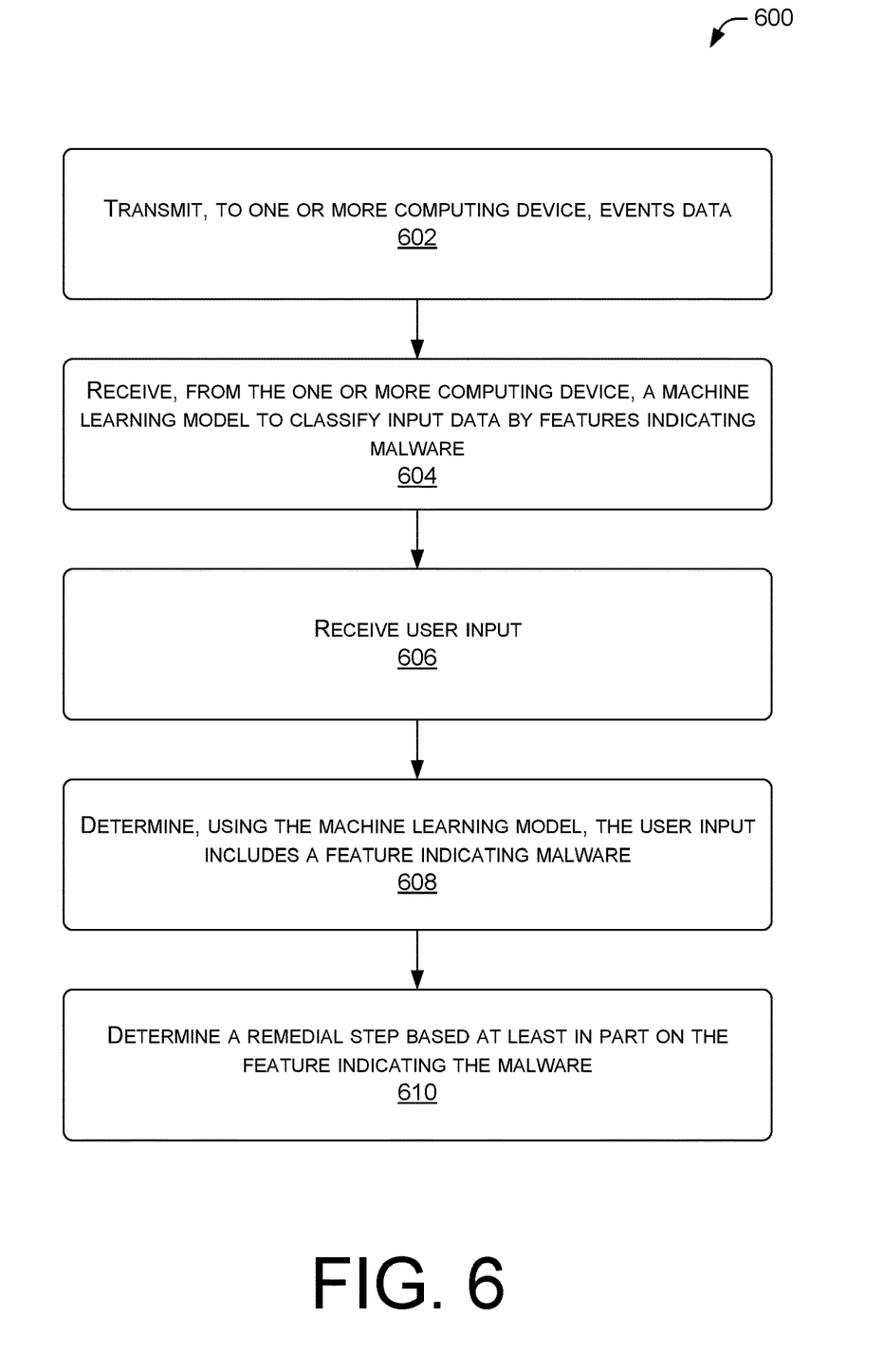
FIG. 6 illustrates another example process for training and deploying a machine learning (ML) malware classifier using behavioral artifacts, as discussed herein.

FIG. 6 illustrates another example process 600 for training and deploying a machine learning (ML) malware classifier using behavioral artifacts, as discussed herein. Some or all of the process 600 may be performed by one or more components in FIGS. 1, 2, and 3, as described herein. For example, some or all of process 600 may be performed by the host device(s) 102, 200 and the computing device(s) 104, 300.

At operation 602, the process may include transmitting, to one or more computing device, events data. For instance, the host device(s) 102 may transmit, to the computing device(s) 104, events data. The monitoring component may be configured to monitor behavioral events on the host device(s) 102 in kernel mode and/or user mode. The monitoring component may generate events data corresponding to monitored operations targeted by malicious attack and/or malware and the sensor component may transmit the events data to the computing device(s) 104 to be used for analysis and/or training data.

At operation 604, the process may include receiving, from the one or more computing device, a machine learning model to classify input data by features indicating malware. For instance, the host device(s) 102 may receive, from the computing device(s) 104, a machine learning model to classify input data by features indicating malware. The machine learning (ML) classifier may include one or more ML models for malware classification. As described herein, the security system on the computing device(s) 104 may train a malware classifier that uses strong uncorrelated features of subsequences of behavioral events for each process in the any portion of the process tree regardless of the order of events or processes. The security system may implement the malware classifier with any ML algorithm (e.g., LR, RF, XGB, NNs, etc.) and transmit the ML malware classifier to the sensor component. The machine learning (ML) classifier may receive the ML malware classifier and implement the malware classification functions. The ML malware classifier may classify input data by features indicating malware.

At operation 606, the process may include receiving user input. In various examples, the computing device(s) 104 or the host device(s) 102 may receive user input. The sensor component may receive and store any user input and/or events data including behavior artifacts received from associated components and processes on the host device(s) 102. The sensor component may gather data from associated components that may be stored in a data store.

At operation 608, the process may include determining, using the machine learning model, the user input includes a feature indicating malware. For instance, the computing device(s) 104 or the host device(s) 102 may determine, using the machine learning model, the user input includes a feature indicating malware. The sensor component may use the ML classifier to process system events and/or user input for malware detection and to continue uninterrupted execution of legitimate processes. The mitigation component may determine a remedial action for the host device(s) 102 based on the malware detection and/or based at least in part on determining a feature indicates the malware.

At operation 610, the process may include determining a remedial step based at least in part on the feature indicating the malware. For instance, the computing device(s) 104 or the host device(s) 102 may determine a remedial step based at least in part on the feature indicating the malware. The mitigation component may determine a remedial action for the host device(s) 102 based on the malware detection and/or based at least in part on determining a feature indicates the malware. The sensor component may detect an attack and the mitigation component may take a remedial action without pausing and/or stopping processes. The remedial action may include killing the malicious processes and removing all traces of the attack leaving legitimate processes untouched.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform selected functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, the software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors; and
   programming instructions configured to be executed by the one or more processors to perform operations comprising:
      receiving, from one or more monitored devices, events data for training data;
      presenting false-negative data of the events data based on a labeled indicator of the false-negative data incorrectly labeled as false-negative or false-positive;
      generating labeled data by relabeling one or more processes in the false-negative data;
      storing the labeled data as the training data;
      determining that the events data is associated with a malicious process;
      determining to map individual events from the events data onto a behavioral activity pattern;
      aggregating multiple events of the individual events into a single artifact, the multiple events produced by the malicious process;
      generating a malware classifier based at least in part on extracting behavioral artifacts including the single artifact from the behavioral activity pattern and building a feature vector associated with the extracted behavior artifacts used for the malware classifier;
      transmitting, to the one or more monitored devices, the malware classifier; and
      receiving, from the one or more monitored devices, additional events data for additional training data.

2. The system of claim 1, wherein the feature vector includes one or more explicit features derived from a file system, a network, a registry, or a processes interaction.

3. The system of claim 1, wherein the events data includes data produced by one or more processes, the one or more processes includes one or more of a network trace, a registry modification, a file system change, and a memory access.

4. The system of claim 3, further comprising:
   determining that the events data is associated with a severity level based at least in part on a classifier for predicting severity of an input data.

5. The system of claim 1, wherein the events data is received over a predetermined period of time.

6. The system of claim 1, wherein the behavioral activity pattern includes a process tree that indicates relationship information associated with one or more of an immediate parent process or a grandparent process.

7. The system of claim 1, wherein determining that the events data is associated with the malicious process includes receiving input to label at least a portion of the events data.

8. The system of claim 1, wherein the events data is filtered to remove known safe behavioral events.

9. A method of behavioral detection on a monitored device, the method comprising:
- transmitting, to one or more computing devices, events data associated with a malicious process, the events data including false-negative data having a labeled indicator incorrectly labeled as false-negative or false-positive, one or more processes in the false-negative data to be relabeled as labeled data and to be stored as training data;
- generating a process tree based on the events data;
- generating features indicating malware by aggregating data corresponding to portions of the process tree;
- receiving, from the one or more computing devices, a machine learning model to classify input data by the features indicating malware;
- receiving, from an input device, user input;
- determining, using the machine learning model, that the user input includes a feature of the features indicating malware;
- determining that a malicious process is associated with the feature; and
- determining to stop the malicious process.

10. The method of claim 9, wherein the events data are produced by at least one process or at least one thread.

11. The method of claim 9, further comprising:
- determining that the malicious process associated with the events data is classified as high severity.

12. The method of claim 9, further comprising:
- removing, from the process tree, all processes associated with the malicious process.

13. The method of claim 9, wherein generating the process tree includes monitoring, using the machine learning model, two or more process threads.

14. The method of claim 13, wherein determining to stop the malicious process comprises stopping a first process thread of the two or more process threads.

15. One or more non-transitory computer-readable media having computer executable instructions that, when executed by one or more processors, cause the one or more processors to perform operations comprising:
- transmitting, to one or more computing devices, events data associated with a malicious process, the events data including false-negative data having a labeled indicator incorrectly labeled as false-negative or false-positive, one or more processes in the false-negative data to be relabeled as labeled data and to be stored as training data;
- generating a process tree based on the events data;
- generating features indicating malware by aggregating data corresponding to portions of the process tree;
- receiving, from the one or more computing devices, a machine learning model to classify input data by the features indicating malware;
- receiving, from an input device, user input;
- determining, using the machine learning model, that the user input includes a feature of the features indicating malware; and
- determining to perform a remedial action based at least in part on the feature.

16. The one or more non-transitory computer-readable media as recited in claim 15, wherein the remedial action includes terminating a malicious process associated with the feature.

17. The one or more non-transitory computer-readable media as recited in claim 15, wherein the operations further comprise:
- removing, from the process tree, all processes associated with the malicious process.

18. The one or more non-transitory computer-readable media as recited in claim 15, wherein:
- the process tree is generated based at least in part on a sliding process window for multiple processes, and
- the sliding process window is associated with a start time and an end time.

19. The one or more non-transitory computer-readable media as recited in claim 15, wherein the operations further comprise:
- determining, using the machine learning model, to monitor two or more process threads.

* * * * *